United States Patent
Kang et al.

(10) Patent No.: US 12,054,801 B2
(45) Date of Patent: *Aug. 6, 2024

(54) ZINC PLATED STEEL SHEET HAVING EXCELLENT SURFACE QUALITY AND SPOT WELDABILITY, AND MANUFACTURING METHOD THEREFOR

(71) Applicant: POSCO, Pohang-si (KR)

(72) Inventors: Ki-Cheol Kang, Gwangyang-si (KR); Sang-Ho Uhm, Incheon (KR); Chung-Hwan Lee, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/780,677

(22) PCT Filed: Dec. 3, 2020

(86) PCT No.: PCT/KR2020/017537
§ 371 (c)(1),
(2) Date: May 27, 2022

(87) PCT Pub. No.: WO2021/112584
PCT Pub. Date: Jun. 10, 2021

(65) Prior Publication Data
US 2023/0018291 A1    Jan. 19, 2023

(30) Foreign Application Priority Data
Dec. 3, 2019    (KR) ........................ 10-2019-0158894

(51) Int. Cl.
| | | |
|---|---|---|
| *C21D 9/46* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/44* | (2006.01) |
| *C22C 38/48* | (2006.01) |
| *C22C 38/50* | (2006.01) |
| *C22C 38/54* | (2006.01) |
| *C22C 38/58* | (2006.01) |
| *C22C 38/60* | (2006.01) |
| *C23C 2/02* | (2006.01) |
| *C23C 2/06* | (2006.01) |
| *C23C 2/28* | (2006.01) |
| *C23C 2/40* | (2006.01) |

(52) U.S. Cl.
CPC .............. *C21D 9/46* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/008* (2013.01); *C22C 38/02* (2013.01); *C22C 38/06* (2013.01); *C22C 38/44* (2013.01); *C22C 38/48* (2013.01); *C22C 38/50* (2013.01); *C22C 38/54* (2013.01); *C22C 38/58* (2013.01); *C22C 38/60* (2013.01); *C23C 2/02* (2013.01); *C23C 2/022* (2022.08); *C23C 2/0224* (2022.08); *C23C 2/024* (2022.08); *C23C 2/06* (2013.01); *C23C 2/28* (2013.01); *C23C 2/40* (2013.01); *C21D 2241/00* (2013.01)

(58) Field of Classification Search
None
See application file for complete search history.

(56) References Cited

U.S. PATENT DOCUMENTS

| | | |
|---|---|---|
| 2013/0327452 A1 | 12/2013 | Fushiwaki et al. |
| 2014/0234658 A1 | 8/2014 | Nozaki et al. |
| 2016/0067947 A1 | 3/2016 | Minowa et al. |

(Continued)

FOREIGN PATENT DOCUMENTS

| | | |
|---|---|---|
| CN | 103154297 A | 6/2013 |
| CN | 105189806 A | 12/2015 |

(Continued)

OTHER PUBLICATIONS

International Search Report dated Mar. 24, 2021 issued in International Patent Application No. PCT/KR2020/017537 (with English translation).

(Continued)

*Primary Examiner* — Anthony M Liang
(74) *Attorney, Agent, or Firm* — Morgan, Lewis & Bockius LLP

(57) ABSTRACT

The present invention relates to a zinc plated steel sheet having excellent surface quality and spot weldability, and a manufacturing method therefore. A zinc plated steel sheet according to one aspect of the present invention comprises a base steel sheet and a zinc-based plating layer formed on the surface of the base steel sheet, wherein the GDOES profile of oxygen, which is measured in the depth direction from the surface of the base steel sheet, has a form in which a local minimum point and a local maximum point alternately appear in the depth direction from the surface, and the difference (a local maximum value–a local minimum value) between the oxygen concentration (a local minimum value) at the local minimum point and the oxygen concentration (a local maximum value) at the local maximum point can be 0.1 wt % or more.

7 Claims, 1 Drawing Sheet

(56) References Cited

U.S. PATENT DOCUMENTS

| | | |
|---|---|---|
| 2016/0222500 A1 | 8/2016 | Tanaka et al. |
| 2017/0088914 A1 | 3/2017 | Ikeda et al. |
| 2017/0369974 A1 | 12/2017 | Kim et al. |
| 2018/0105908 A1 | 4/2018 | Hayashi et al. |
| 2018/0298462 A1 | 10/2018 | Sano et al. |
| 2020/0190652 A1 | 6/2020 | Takeda et al. |
| 2020/0325568 A1 | 10/2020 | Jin et al. |
| 2020/0332379 A1 | 10/2020 | Friedel et al. |
| 2022/0056564 A1 | 2/2022 | Kang et al. |

FOREIGN PATENT DOCUMENTS

| | | | |
|---|---|---|---|
| CN | 107002207 A | 8/2017 | |
| CN | 109023133 A | 12/2018 | |
| CN | 113195776 A | 7/2021 | |
| EP | 3392363 A1 | 10/2018 | |
| EP | 3901319 A2 | 10/2021 | |
| JP | 61-279311 A | 12/1986 | |
| JP | 62-63687 A | 3/1987 | |
| JP | 2972124 B2 | 8/1999 | |
| JP | 2007-211279 A | 8/2007 | |
| JP | 2011-219780 A | 11/2011 | |
| JP | 2012-041597 A | 3/2012 | |
| JP | 2013-167020 A | 8/2013 | |
| JP | 2014-9399 A | 1/2014 | |
| JP | 2014-122379 A | 7/2014 | |
| JP | 2018-188717 A | 11/2018 | |
| JP | 2019-521257 A | 7/2019 | |
| JP | 2019-532172 A | 11/2019 | |
| KR | 10-2015-0131386 A | 11/2015 | |
| KR | 10-2016-0055870 A | 5/2016 | |
| KR | 10-1630976 B1 | 6/2016 | |
| KR | 10-2018-0088487 A | 8/2018 | |
| KR | 10-2019-0073200 A | 6/2019 | |
| KR | 20190073200 A * | 6/2019 | ............... C21D 3/04 |
| WO | 2013/047836 A1 | 4/2013 | |
| WO | 2016/171237 A1 | 10/2016 | |
| WO | 2016/199922 A1 | 12/2016 | |

OTHER PUBLICATIONS

European Search Report dated Nov. 22, 2022 issued in European Patent Application No. 20896333.0.

Chinese Office Action dated Apr. 1, 2023 issued in Chinese Patent Application No. 202080084149.6.

Office Action issued Aug. 29, 2023 for counterpart Japanese Patent Application No. 2022-532724.

* cited by examiner

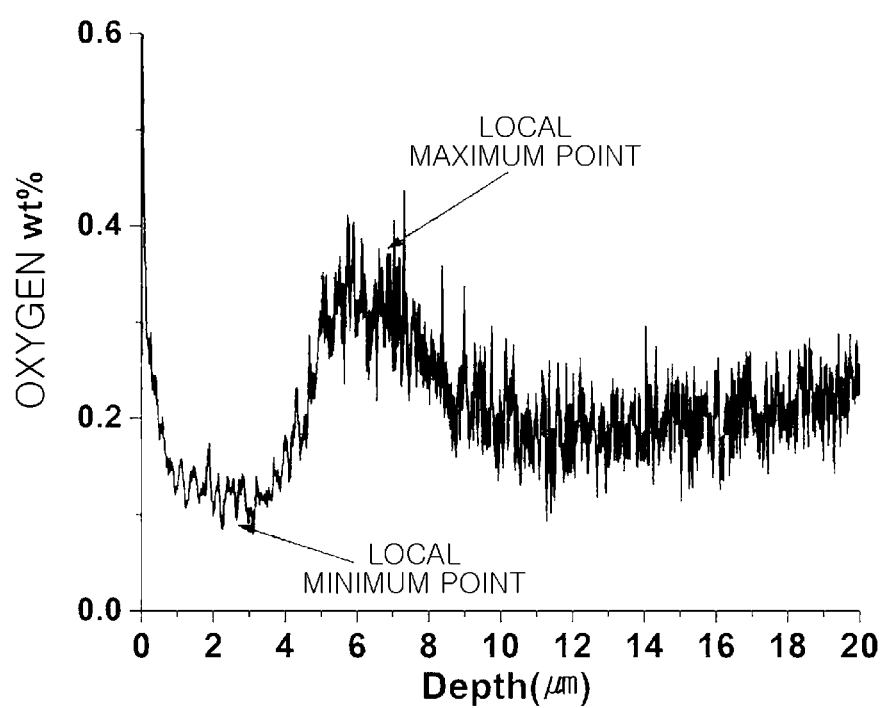

ZINC PLATED STEEL SHEET HAVING EXCELLENT SURFACE QUALITY AND SPOT WELDABILITY, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/017537, filed on Dec. 3, 2020, which in turn claims the benefit of Korean Application No. 10-2019-0158894, filed on Dec. 3, 2019, the entire disclosures of which applications are incorporated by reference herein.

TECHNICAL FIELD

The present disclosure relates to a zinc plated steel sheet having excellent surface quality and spot weldability, and a manufacturing method therefor.

BACKGROUND ART

Regulations regarding exhaust gas and fuel efficiency of vehicles are increasingly enforced due to problems such as environmental pollution. Accordingly, demand for reduction of a fuel consumption amount through reduction of the weight of the steel sheets for vehicles is increased, so various high strength steel sheets having high strength per unit thickness are developed and released.

High strength steel generally is steel having strength over 490 Mpa, but is not limited thereto, and Transformation Induced Plasticity (TRIP) steel, Twin Induced Plasticity (TWIP) steel, Dual Phase (DP) steel, Complex Phase (CP) steel may be considered to be high strength steel.

Meanwhile, automotive steel materials are supplied in a plated steel sheet type having plating surfaces to secure anticorrosion. A galvanized steel sheet (GI steel sheet) or a galvannealed steel sheet (GA) of the steel sheets is generally used as the material of vehicles because it has high anticorrosion using the sacrificial protection of zinc.

However, when the surface of a high strength steel sheet is plated with zinc, there is a problem that spot weldability is deteriorated. That is, since high strength steel has high tensile strength and yield strength, it is difficult to remove tensile stress, which is generated during welding, using plastic deformation, so there is a high possibility that microcracking will be generated in the surfaces. When welding is applied to a high strength galvanized steel sheet, zinc having a low melting point permeates into microcracking of the steel sheet, and accordingly, a phenomenon called Liquid Metal Embrittlement (LME) occurs and a problem that the steel sheets ends up with failure, which acts as a significant obstacle to increasing the strength of steel sheets.

In addition, alloy components included in a large quantity in high strength steel sheets such as Si, Al, and Mn diffuse to the surface of the steel sheets, thereby producing surface oxides, which results in deterioration of wettability. Accordingly, there is a possibility of deterioration of surface quality such as non-plating.

DISCLOSURE

Technical Problem

According to an aspect of the present disclosure, a zinc plated steel sheet having excellent surface quality and spot weldability, and a manufacturing method therefor are provided.

The objectives of the present disclosure are not limited to that described above. Those skilled in the art would understand additional objectives of the present disclosure without difficulty from the general contents in the specification.

Technical Solution

A zinc plated steel sheet according to one aspect of the present disclosure includes a base steel sheet and a zinc-based plating layer formed on the surface of the base steel sheet, wherein the GDOES profile of oxygen, which is measured in the depth direction from the surface of the base steel sheet, has a form in which a local minimum point and a local maximum point alternately appear in the depth direction from the surface, and the difference (a local maximum value–a local minimum value) between the oxygen concentration (a local minimum value) at the local minimum point and the oxygen concentration (a local maximum value) at the local maximum point can be 0.1 percent by weight or more.

A method of manufacturing a zinc plated steel sheet according to another aspect of the present disclosure may include: obtaining a steel sheet by hot-rolling a steel slab; obtaining a hot-rolled steel sheet by winding the steel sheet at a temperature of 590~750° C.; acid-pickling the hot-rolled steel sheet at a mill speed of 180~250 mpm; obtaining a cold-rolled steel sheet by cold-rolling the hot-rolled steel sheet at a reduction ratio of 35~60%; recrystallization-annealing the cold-rolled steel sheet at 650~900° C. in an atmosphere of a −10~30° C. dew point; and hot-dip galvanizing the annealed cold-rolled steel sheet.

Advantageous Effects

As described above, the present disclosure appropriately controls an oxygen profile formed in a base steel sheet constituting a plating layer, thereby being able to suppress generation of cracks in spot welding and providing a zinc plated steel sheet having excellent surface quality.

BRIEF DESCRIPTION OF THE DRAWINGS

FIG. 1 is a graph illustrating a GDOES profile of an oxidation concentration having a local maximum point and a local minimum point in accordance with an embodiment of the present disclosure.

BEST MODE

Hereafter, the present disclosure is described in detail with reference to some embodiments.

It should be noted that a zinc plated steel sheet stated in the present disclosure conceptually includes all of not only a galvanized steel sheet (GI steel sheet) or a galvannealed steel sheet (GA), but plated steel sheets having an zinc-based layer mainly including zinc. The fact that zinc is mainly included is that the ratio of zinc is the highest in the components included in a plating layer. However, the ratio of steel may be higher than the ratio of zinc in a galvannealed steel sheet, and even steel sheets in which the ratio of zinc is the highest in the other components except for steel may be included in the range of the present disclosure.

The inventors of the present disclosure studied a is of suppression microcracking in a surface on the basis of the point that Liquid Metal Embrittlement (LME) that is generated in welding is caused by microcracking that are generated from the surface of a steel sheet and found out that it is required to soften the surface of a steel sheet for the means, thereby reaching the present disclosure.

In general, high strength steel may include components such as C, Mn, Si, Cr, Mo, and V in a large quantity to secure hadenability of steel or stability of austenite, and these components increase sensitivity to cracks of steel. Accordingly, microcracking are easily generated in steel including a large amount of these components, which consequently causes LME in welding.

According to the result of a study by the inventors, when the distribution of oxygen concentration according to a depth is controlled in a specific type, it is possible to considerably reduce the possibility of microcracking in the surface, so it is possible to improve spot welability. That is, in an embodiment of the present disclosure, the profile of oxygen concentration measured to the inside from the surface of a base steel sheet using Glow Discharge Optical Emission Spectrometry (GDOES) may have a type similar to FIG. 1, and when the profile is controlled in this way, it is possible to improve the surface quality of plated steel sheet and it is also possible to remarkably prevent microcracking and corresponding LME.

That is, an oxygen concentration profile in a depth direction from the surface of a steel sheet according to an embodiment of the present disclosure has a local minimum point under the surface of the steel sheet and a local maximum point deeper inside than the local minimum point. That is, a local minimum point and a local maximum point sequentially appear in the depth direction from the surface. However, the term 'surface', which means the surface of a base steel sheet rather than a plating layer, means the boundary of a plating layer and a steel sheet if a plating layer is formed.

In the present disclosure, an oxygen profile is made appear at a deep portion from the surface of steel sheet such that an internal oxide forming an oxide is accumulated inside without diffusing to the surface. Further, an oxygen profile has a local minimum point close to the surface, whereby it is possible to suppress stationary oxygen similar to an oxide and adjust a decarburized layer to grow well. In particular, according to the result of a study by the inventors of the present disclosure, it is possible to considerably suppress LME when controlling the difference between the oxygen concentration at the local maximum point and the oxygen concentration at the local minimum point over 0.1 percent by weight. According to an embodiment of the present disclosure, the difference between the oxygen concentration at a local maximum point and the oxygen concentration at a local minimum point in the GDOES oxygen depth profile may be 0.12 percent by weight. Further, in another embodiment, the difference between the oxygen concentration at a local maximum point and the oxygen concentration at a local minimum point in the GDOES oxygen depth profile (hereafter, also briefly referred to as 'difference between a local minimum value and a local maximum value') is 0.14 percent by weight or more, or 0.16 percent by weight or more.

The larger the difference between a local minimum value and a local maximum value, the more advantageous it is in the GDOES oxygen depth profile, so the upper limit of a decarburization rate does not need to be specifically limited. However, according to an embodiment of the present disclosure, the upper limit of the difference between a local minimum value and the local maximum value in the GDOES oxygen depth profile may be determined as 0.39 percent by weight, the upper limit of the difference between a local minimum value and the local maximum value in the GDOES oxygen depth profile may be determined as 0.37 percent by weight, and the upper limit of the difference between a local minimum value and the local maximum value in the GDOES oxygen depth profile may be determined as 0.35 percent by weight in another embodiment.

In an embodiment of the present disclosure, it is more advantageous that the oxygen concentration at the local maximum point is 0.2 percent by weight or more to prevent a poor surface quality due to non-plating, etc. in plating. Further, according to an embodiment of the present disclosure, the oxygen concentration at the local maximum point may be 0.25 percent by weight, or may be 0.3 percent by weight, depending on cases. It is not required to specifically limit the upper limit of the oxygen concentration at a local maximum point, but the upper limit of the oxygen concentration at a local maximum point may be determined as 5.0 percent by weight, 4.0 percent by weight, or 3.0 percent by weight.

Accordingly, in an embodiment of the present disclosure, the entire composition of steel is given the composition of high alloy steel for high strength, and a soft layer is formed at a surface layer, which is a point at which cracks are generated, and the distribution of an internal oxide is controlled, whereby it is possible to improve both resistance and a surface quality against LME in welding.

In the present disclosure, it is possible to find the oxygen concentration at a local maximum point and the oxygen concentration at a local minimum point as follows. First, as shown in FIG. 1, a GDOES profile is found. The GDOES profile may be found at every 10~30 nm depth, and GDOES profiles found at every 20 nm depth was used in an embodiment of the present disclosure. The found initial data substantially have a local minimum point and a local maximum point, as shown in FIG. 1, but it may be slight difficult to determine the accurate positions. In this case, when the oxygen concentration profile at each point is found using a 5-point average value obtained by averaging the data values each ahead of and behind a corresponding point, it may show a flatted shape.

It is possible to find a local minimum point, a local maximum point, and oxygen concentrations corresponding to the points in the oxygen concentration profile found through this process. The local minimum point is the point showing the lowest value in the equalized oxygen concentration profile and the local maximum point means the point showing the highest point at a point after the local minimum point. In an embodiment, the local minimum point may appear at a point within a depth of 10 μm from the surface of a steel sheet and the local maximum point may appear at a depth larger than 4 μm from the surface of the steel sheet. Further, according to an embodiment of the present disclosure, the local minimum point may appear at a depth larger than 0.5 μm from the surface of a steel sheet and the local maximum point may appear at a depth less than 15 μm from the surface of the steel sheet.

In an embodiment of the present disclosure, the GDOES oxygen depth profile may be measured at the center in the width direction of a steel sheet. However, since the profile has a value that is generally higher at the edge in the width direction than that at the center of a steel sheet in many cases, a profile measured at an edge may be used to more effectively improve spot weldability. In this case, the edge means both ends of a steel sheet, but may mean a position at 1 mm inside from an end when there is a problem with the soundness of a specimen such as contamination at the point.

The kind of a steel sheet that is the object of the present disclosure is not limited as long as the high strength steel sheet has strength of 490 MPa or more. However, the steel sheet is not necessarily limited thereto, and the steel sheet that is the object of the present disclosure may have composition of C: 0.05~1.5%, Si: 2.0% or less, Mn: 1.0~30%, S—Al (acid-soluble aluminum): 3% or less, Cr: 2.5% or less, Mo: 1% or less, B: 0.005% or less, Nb: 0.2% or less, Ti: 0.2% or less, V: 0.2% or less, Sb+Sn+Bi: 0.1% or less, and N: 0.01% in percent by weight. Other components are Fe and other impurities, and the case further including elements that may be included in steel not stated above within the range of 1.0% or less in total. The content of each component element is expressed on the basis of weight unless specifically stated in the present disclosure. The composition described above means bulk composition of a steel sheet, that is, the composition at the point of ¼ of the thickness of a steel sheet.

In some embodiments of the present disclosure, TRIP steel, etc. may be the high strength steel sheet. These steels may have the following composition when classified in detail.

Steel composition 1: C: 0.05~0.30% (preferably, 0.10~0.25%), Si: 0.5~2.5% (preferably, 1.0~1.8%), Mn: 1.5~4.0% (preferably, 2.0~3.0%), S—Al: 1.0% or less (preferably, 0.05% or less), Cr: 2.0% or less (preferably, 1.0% or less), Mo: 0.2% or less (preferably, 0.1% or less), B: 0.005% or less (preferably, 0.004% or less), Nb: 0.1% or less (preferably, 0.05% or less), Ti: 0.1% or less (preferably, 0.001~0.05%), Sb+Sn+Bi: 0.05% or less, N: 0.01% or less, and a balance of Fe and unavoidable impurities. Depending on cases, elements that are not stated above but may be included in steel may by included within the range of 1.0% or less in total.

Steel composition 2: C: 0.05~0.30% (preferably, 0.10~0.2%), Si: 0.5% or less (preferably, 0.3% or less), Mn: 4.0~10.0% (preferably, 5.0~9.0%), S—Al: 0.05% or less (preferably, 0.001~0.04%), Cr: 2.0% or less (preferably, 1.0% or less), Mo: 0.5% or less (preferably, 0.1~0.35%), B: 0.005% or less (preferably, 0.004% or less), Nb: 0.1% or less (preferably, 0.05% or less), Ti: 0.15% or less (preferably, 0.001~0.1%), Sb+Sn+Bi: 0.05% or less, N: 0.01% or less, and a balance of Fe and unavoidable impurities. Depending on cases, elements that are not stated above but may be included in steel may by included within the range of 1.0% or less in total.

Further, when the lower limits of the component elements described above are not limited, it means that they may be considered to be certain elements and the contents may be 0%.

According to an embodiment of the present disclosure, one or more plating layers may be included in the surface of the steel sheet, and the plating layer may be zinc-based plating layer including GI (Galvanized), GA (Galvannealed), or the like. Since the GDOES oxygen depth profile was appropriately removed in the present disclosure, as described above, even though a zinc-based plating layer is formed on the surface of a steel sheet, it is possible to suppress LME that is generated in spot welding.

When the zinc-based plating layer is a GA layer, the degree of alloying (which is the content of Fe in a plating layer) may be controlled at 8~13 percent by weight, preferably, 10~12 percent by weight. When the degree of alloying is insufficient, a possibility that zinc in the zinc-based plating layer permeates into microcracking and causes LME may remain. On the contrary, when the degree of alloying is excessively high, problems such as powdering may be caused.

Further, the plating adherence amount of the zinc-based plating layer may be 30~70 g/m². When the plating adherence amount is excessively small, sufficient anticorrosion is difficult to obtain, and when the plating adherence amount is excessively large, an increase of manufacturing cost and LME may be caused, so the plating adherence amount is controlled within the range described above. A more preferable range of the plating adherence amount may be 40~60 g/m². The plating adherence amount is the amount of a plating layer adhering to a final product, and when a plating layer is a GA layer, the plating adherence amount is increased by alloying, so the weight may slight decreases before alloying and the plating adherence amount depends on the degree of alloying. Accordingly, the plating adherence amount is not necessarily limited thereto and the adherence amount before alloying (that is, the amount of plating adhering from a plating bath) may be a value decreasing about 10% from range described above.

Hereafter, an embodiment of manufacturing a steel sheet of the present disclosure is described. However, it should be noted that the steel sheet of the present disclosure is not necessarily manufactured by the following embodiment and the following embodiment is a preferable means of manufacturing the steel sheet of the present disclosure.

First, it is possible to manufacture a hot-rolled steel sheet by preparing, hot-rolling, and then winding a steel slab. Conditions such as hot rolling are not specifically limited, but the heating temperature and winding temperature of a slab may be limited as follows in an embodiment of the present disclosure.

Heating of slab: 950~1300° C.

It is required to sufficiently apply solution treatment to solution elements and heat a slab at a temperature 950° C. or more to reduce rolling resistance. A large amount of alloy elements are included in the present disclosure, the heating temperature of a slab may be 1000° C. or more, preferably, 1050° C. or more. However, when the heating temperature of a slab is excessively high, oxidation of solution elements, etc. may be generated, the size of austenite grains may be increased, and it is not advantageous in terms of energy, so the upper limit of the heating temperature may be determined as 1300° C., preferably 1280° C., and more preferably 1250° C. or less.

Winding temperature: 590~750° C.

A hot-rolled steel sheet is wound and stored later in a coil shape, and the wound steel sheet undergoes slow cooling. Oxidizing elements included in the surface layer of the steel sheet are removed in this process, and when the winding temperature of the hot-rolled steel sheet is excessively low, the coil is slowly cooled at a temperature lower than the temperature for oxidation removal of the elements, so it is difficult to achieve a sufficient effect.

Acid pickling is performed by inserting the hot-rolled steel sheet that has undergone the process described above in to an acidic chloride bath to remove a hot roll scale. The hydrochloride acid concentration of the acidic chloride bath in acid pickling is within the range of 10~30 percent by volume and the speed of an acid pickling mill is 180~250 mpm. When the acid pickling speed exceeds 250 mpm, the surface scale of the hot-rolled steel sheet may not be completely removed, and when the acid pickling speed is lower than 180 mpm, the surface layer of base steel may be corroded by hydrochloric acid, so acid pickling is performed at 180 mpm or more.

Cold rolling is performed after acid pickling. The cold reduction ratio in cold rolling is in the range of 35~60%. When the cold-rolling reduction ratio is less than 35%, there is no specific problem, but driving force for recrystallization is insufficient in annealing, so it is difficult to sufficiently control microstructures. When the cold reduction ratio exceeds 60%, the thickness of the internal oxidation layer secured in the hot rolling decreases, it is difficult to have sufficient internal oxidation depth and maximum oxygen concentration after annealing.

Recrystallization annealing of the steel sheet may be performed after the cold rolling. Since the difference between a local minimum value and a local maximum value in a GDOES oxygen depth profile of the surface layer may change even in annealing of the steel sheet, it is possible to control annealing under the condition of appropriately controlling the difference between a local minimum value and a local maximum value in a GDOES oxygen depth profile of the surface layer in an embodiment of the present disclosure, and the mill speed and dew point in an annealing furnace may be controlled under the following conditions.

Mill speed: 40~130 mpm

The mill speed of the cold-rolled steel sheet should be 40 mpm or more to secure sufficient productivity. However, when the mill speed is excessively high, it may be disadvantageous in terms of securing the material, the upper limit of the mill speed may be determined as 130 mpm in an embodiment of the present disclosure.

Dew point control in annealing furnace: controlled within range of −10~30° C. at 650~900° C.

It is advantageous to control the dew point in an annealing furnace in order to a surface layer decarburization rate within an appropriate range. When the dew point is excessively low, surface oxidation occurs rather than internal oxidation, so there is a possibility that oxides such as Si, Mn, or the like are produced on the surface. Such oxides have a negative influence on plating. Accordingly, it is required to control the dew point at −10° C. or more. On the contrary, when the dew point is excessive high, there is a possibility of oxidation of Fe, so it is required to control the dew point at 30° C. or less. As described above, the temperature for controlling a dew point may be 650° C. or more which is a temperature at which sufficient internal oxidation effect is achieved. In an embodiment of the present disclosure, a temperature and a dew point in an annealing furnace may be determined on the basis of the temperature and the dew point of a soaking zone. However, when a temperature is excessively high, surface oxides such as Si are produced, not only they interfere with diffusion of oxygen to the inside, but austenite is excessively produced while the soaking zone is heated, so the carbon diffusion speed decreases and accordingly, the internal oxidation level may decrease. Further, the size of austenite in the soaking zone grows excessively, so the material is softened. Further, load of the annealing furnace is generated, which may cause a problem that the facility lifespan decreases and the process cost increases, so the temperature for controlling the dew point may be 900° C. or less.

In this case, the dew point may be adjusted by inserting wet nitrogen gas ($N_2+H_2O$) into the annealing furnace. According to an embodiment of the present disclosure, the nitrogen gas may include hydrogen ($H_2$) of 5~10%, so it is possible to control the dew point within an appropriate range.

Hot dip galvanizing is performed by submerging the steel sheet annealed by this process into a plating bath and the hot dip galvanized steel sheet may undergo alloying heat treatment later, if necessary. Preferred conditions for plating and alloying heat treatment are as follows.

Entering temperature of steel sheet into plating bath: 420~500° C.

When the entering temperature a steel sheet into a plating bath is low, wettability is not sufficiently secured in the contact interface between the steel sheet and liquid-state zinc, so a temperature of 420° C. or more should be maintained. When the temperature is excessively high, the reaction of the steel sheet and the liquid-state zinc is excessive, a Zetta phase that is an Fe—Zn alloy phase is generated on the interface, so there is a problem that adhesion of the plating layer is deteriorated and dross is produced in the plating path due to excessive extraction amount of an Fe element of the steel sheet in the plating bath.

Al concentration in plating bath: 0.10~0.25%

An Al concentration in plating bath should be appropriately maintained to secure wettability of a plating layer and fluidity of the plating bath. To this end, in the present disclosure, the in-plating bath Al concentration is controlled within the range of 0.10~0.25%. Further, a steel sheet can be classified as a Galvannealed (GA) steel sheet and a Galvanized (GI) steel sheet. In an embodiment of the present disclosure, in order to maintain production of dross in a plating bath at an appropriate level and to secure plating surface quality and performance, it is possible to control the Al content in the GA steel sheet at 0.10~0.15% and the Al content in the GI steel sheet at 0.2~0.25%.

Alloying (GA) temperature: 480~560° C.

When the temperature is less than 480° C., the Fe diffusion amount is small, so the degree of alloying is insufficient and the plating property may not be good, and when the temperature exceeds 560° C., powdering may be caused due to excessive alloying and the material may be deteriorated due to transformation of residual austenite into ferrite, so the alloying temperature is determined in the range.

Accordingly, the galvanized steel sheet of the present invention can be achieved. However, in an embodiment of the present disclosure, an edge heating process to be described below may be further included to further improve weldability at the edge.

Heating of hot-rolled coil edge: It is performed for 5~24 hours at 600~800° C.

In an embodiment of the present disclosure, a hot-rolled coil edge may be heated to further increase the difference between a local minimum value and a local maximum value in the GDOES oxygen depth profile of the edge. Hot-rolled coil edge heating means heating both ends in the width direction, that is, the edge of a wound coil, in which an edge is heated first at a temperature suitable for oxidation by edge heating. That is, the inside of a wound coil is maintained at a high temperature, but the edge is relatively quickly cooled, so the temperature suitable for internal oxidation is maintained shorter at the edge. Accordingly, removal of oxidizing elements is not active at the edge in comparison to the center in the width direction. Edge heating may be used as a means for removing oxidizing elements.

That is, when edge heating is performed, an edge is heated first opposite to cooling after winding, and accordingly, the temperature at the edge in the width direction is maintained to be suitable for internal oxidation, which results in an increase of the thickness of the internal oxidation layer of the edge. To this end, the edge heating temperature should be 600° C. or more (on the basis of the temperature of the edge of a steel sheet). However, when the temperature is excessively high, scale may be excessively produced or a porous high-oxidation scale (hematite) is produced at the edge during heating, so the surface state may be deteriorated after acid pickling. Accordingly, the edge temperature may be 800° C. or less. More preferably, the edge heating temperature is 600~750° C.

Further, the edge heating time should be 5 hours or more to remove non-uniformity of the difference between a local minimum value and a local maximum value in a surface layer GDOES oxygen depth profile between a width-directional edge and a center which is generated in winding. However, when the edge heating time is excessively long, a scale may be excessive produced or the difference between the local minimum value and the local maximum value in the surface layer GDOES oxygen depth profile of the edge may be excessively increased. Accordingly, the edge heating time may be 24 hours or less.

According to an embodiment of the present disclosure, the edge heating may be made by a combustion heating method through air-fuel ratio adjustment. That is, an oxygen fraction in an atmosphere may be changed by air-fuel ratio adjustment. The higher the partial pressure of oxygen, the higher the concentration of oxygen coming in contact with the surface layer of a steel sheet, so decarburization or internal oxidation may increase. The present disclosure is not necessarily limited thereto, but in an embodiment of the present disclosure, it can be controlled in a nitrogen atmosphere including oxygen of 1~2% through air-fuel ratio adjustment. Those skilled in the art may control the oxygen fracture through air-fuel ratio adjustment without a specific difficulty, so it is not specifically described.

MODE FOR INVENTION

Hereafter, the present disclosure is described in more detail through embodiments. However, it should be noted that the following embodiments are provided only to concrete the present disclosure through exemplification rather than limiting the right range of the present disclosure. This is because the right range of the present disclosure is determined the matters described in claims and matters reasonably inferred from the matters described in claims.

Embodiment

Steel slabs having the compositions described in the following Table 1 (the balance not described in the table is Fe and unavoidably included impurities, B and N were expressed in the unit of ppm in the table, the other components are expressed in the unit of percent by weight, and the contents of components not described in the table mean 0 percent by weight) were heated at 1234° C. and hot-rolled, and then edge heating was performed on hot-rolled coils. Thereafter, steel sheets moving at a mill speed or 210 mpm on an acid pickling line with a length of 100 mm underwent acid picking with hydrochloride solution of 19.2 percent by volume and the cold-rolled. Further, galvanizing was performed by annealing obtained cold-rolled steel sheets in an annealing furnace and then immediately submerging GA into a plating bath including Al of 0.13% and submerging GI into a zinc-based plating bath at 456° C. including Al of 0.24 percent by weight. Hot dip galvannealed steel sheets were finally obtained by applying alloying (GA) heat treatment to obtained hot dip galvanized steel sheets, if necessary.

The adhesion amounts of the steel sheets submerged in the zinc-based plating bath including Al of 0.24 percent by weight were adjusted through air knifing and cooling was performed, whereby hot dip galvanized steel sheets were obtained.

In all embodiments, the ratio of hydrogen in an annealing bath was determined as 5.0 percent by volume and the entering temperature of steel sheets that were entered in a hot dip galvanizing bath was 475° C. Other conditions in each embodiment are described in the following Table 2.

TABLE 1

| Steel type | C | Si | Mn | S—Al | Cr | Mo | B | N | Nb | Ti | Sb | Sn | Bi |
|---|---|---|---|---|---|---|---|---|---|---|---|---|---|
| A | 0.245 | 0.245 | 7.214 | 0.0027 | 0 | 0 | 15 | 0.0012 | 0.017 | 0.019 | 0 | 0 | 0 |
| B | 0.2125 | 1.548 | 2.2255 | 0.0052 | 0 | 0.0024 | 17 | 0.0024 | 0.024 | 0.014 | 0 | 0.0045 | 0 |
| C | 0.214 | 0.02 | 6.875 | 0.0025 | 0 | 0 | 11 | 0.0045 | 0 | 0.054 | 0 | 0 | 0 |
| D | 0.175 | 1.542 | 2.685 | 0.0054 | 0.457 | 0.0475 | 11 | 0.0074 | 0.05 | 0.032 | 0 | 0 | 0.0021 |
| E | 0.195 | 1.425 | 2.654 | 0.0024 | 0.354 | 0.0021 | 14 | 0.0032 | 0 | 0.021 | 0.011 | 0 | 0 |

TABLE 2

| Steel type | Items | Hot-rolling winding temperature (° C.) | Cold-rolling reduction ratio (%) | Annealing mill speed (mpm) | soaking zone temperature (° C.) | Soaking zone dew point (° C.) | GA temperature (° C.) |
|---|---|---|---|---|---|---|---|
| C | Invention example 1 | 651 | 52 | 76 | 851 | 7 | 501 |
| E | Comparative example 1 | 624 | 51 | 84 | 817 | 37 | — |
| C | Comparative example 2 | 634 | 41 | 142 | 748 | 5 | 517 |
| A | Invention example 2 | 601 | 52 | 82 | 824 | 8 | 521 |
| B | Comparative example 3 | 654 | 53 | 96 | 810 | −14 | 521 |
| E | Comparative example 4 | 617 | 41 | 37 | 765 | −7 | 536 |
| D | Invention example 3 | 685 | 48 | 84 | 865 | 26 | 521 |

TABLE 2-continued

| Steel type | Items | Hot-rolling winding temperature (° C.) | Cold-rolling reduction ratio (%) | Annealing mill speed (mpm) | soaking zone temperature (° C.) | Soaking zone dew point (° C.) | GA temperature (° C.) |
|---|---|---|---|---|---|---|---|
| D | Comparative example 5 | 504 | 57 | 117 | 784 | 14 | — |
| D | Invention example 4 | 632 | 45 | 62 | 784 | 15 | 547 |
| E | Comparative example 6 | 634 | 49 | 81 | 805 | 21 | 571 |
| A | Invention example 5 | 651 | 44 | 67 | 824 | 17 | — |
| B | Invention example 6 | 695 | 45 | 72 | 841 | 6 | — |
| A | Comparative example 7 | 617 | 75 | 123 | 762 | 20 | 497 |
| C | Comparative example 8 | 634 | 52 | 74 | 621 | 14 | 508 |
| E | Invention example 7 | 612 | 46 | 54 | 754 | 21 | 482 |
| E | Invention example 8 | 647 | 51 | 81 | 824 | 5 | 495 |
| B | Comparative example 9 | 776 | 51 | 127 | 795 | 12 | 514 |
| C | Invention example 9 | 615 | 47 | 75 | 795 | 4 | — |
| A | Comparative example 10 | 624 | 40 | 105 | 917 | −4 | 541 |
| B | Invention example 10 | 621 | 45 | 72 | 842 | 7 | 517 |
| B | Comparative example 11 | 627 | 50 | 83 | 813 | 1 | 457 |

The properties of the hot dip galvanized steel sheets manufactured by the above process were measured and the result of observing whether LME was generated in spot welding as shown in FIG. 3. Spot welding was performed along edges formed by cutting the steel sheets in the width direction. A spot welding current was applied two times and elasticity was applied, and then hold time of 1 cycle was maintained. Spot welding was performed in dissimilar 3 sheet. Test material-test material-GA 980DP 1.4t material were sequentially stacked and spot welding was performed. A new electrode is welded to a soft material 15 times in spot welding, the electrode is worn, and then an upper limit current at which expulsion to spot welding materials is measured. Spot welding was performed 8 times for each welding current at a current lower by 0.5 and 1.0 kA than the upper limit current after the upper limit current was measured, the cross-section of the spot-welded portion was precisely machined through electrical discharge machining and then polished through epoxy mounting, and then crack lengths were measured through an optical microscope. The magnification in observation using the optical microscope was determined as 100, it was determined that LME was not generated when a crack was not found at the magnification, and a length was measured using image analysis software when a crack was found. When B-type cracks generated at the shoulder of spot-welded portion was 100 µm or less and C-type cracks are not found, steel sheets were determined as being good.

The difference between a local minimum value and a local maximum value in a surface layer GDOES oxygen depth profile was calculated using an oxygen concentration at each depth obtained by averaging, at 5 points, data obtained from the GDOES profile. A minimum value appearing at a depth of 0.5~10 µm was determined as a local minimum point, and a maximum value generated at a position deeper than the local minimum point and appearing at a depth of 4~15 µm was determined as a local maximum point.

The difference between a local minimum value and a local maximum value in the surface layer GDOES oxygen depth profile was determined as a value obtained by measuring an oxygen concentration at the local maximum point and the local minimum point of oxygen at a point within a depth of 15 µm and subtracting the oxygen concentration at the local minimum point from the oxygen concentration at the local maximum point, and steel sheets were determined as being good when the value is 0.1% or more.

Tensile strength was measured by manufacturing a C-direction sample of JIS-5 and performing a tension test. The degree of alloying and the plating adhesion amount were measured using wet dissolving that uses a hydrochloride solution. Whether plating was separated was determined through an SBT by bonding a D-type adhesive for an automotive structure to a plating surface and then bending the steel sheets at 90 degrees.

A powdering test and flaking test were performed on GA steel sheets. In powdering, what millimeter of plating layer was stuck on a tape was determined by bending a plating material at 90 degrees and then bonding and separating the tape to and from the bent portion. Steel sheets were determined as being poor when the length of the plating layer separated from the tape exceeds 10 mm. In the flaking test, the steel sheets were machined in a '⊏' shape and whether a plating layer was separated at the machined portion was determined.

For the GI steel sheets, a Sealer bending test (SBT) that checks whether a plating layer is separated and adhered to a sealer-separated surface when adhering an adhesive for an automotive structure to a surface and bending the steel sheets was performed. The surface quality was determined by visually checking whether there is a defect such as non-plating on the steel sheets, and steel sheets were determined as being poor when no defect was found through visual observation of non-plating, etc.

TABLE 3

| Items | 1) | Tensile strength (MPa) | Plating type | Plating adhesion amount (g/m²) | Surface quality | 2) | Flaking | SBT | 3) | 4) |
|---|---|---|---|---|---|---|---|---|---|---|
| Invention example 1 | 0.19 | 1,204 | GA | 47 | Good | 5 | Good | — | 62 | ND |
| Comparative example 1 | 0.56 | 769 | GI | 60 | Good | — | — | Good | 15 | ND |
| Comparative example 2 | 0.06 | 1,201 | GA | 46 | Good | 5 | Good | — | 114 | 769 |
| Invention example 2 | 0.21 | 1,218 | GA | 47 | Good | 4 | Good | — | 45 | ND |
| Comparative example 3 | 0.08 | 1,017 | GA | 45 | Poor | 4 | Good | — | 124 | 769 |
| Comparative example 4 | 0.12 | 775 | GA | 44 | Good | 4 | Good | — | 21 | ND |
| Invention example 3 | 0.31 | 1,192 | GA | 45 | Good | 6 | Good | — | 15 | ND |
| Comparative example 5 | 0.07 | 1,193 | GI | 61 | Good | — | — | Good | 121 | 524 |
| Invention example 4 | 0.25 | 1,245 | GA | 47 | Good | 2 | Good | — | 31 | ND |
| Comparative example 6 | 0.21 | 1,194 | GA | 44 | Good | 13 | Good | — | 32 | ND |
| Invention example 5 | 0.2 | 1,258 | GI | 59 | Good | — | — | Good | 24 | ND |
| Invention example 6 | 0.18 | 1,184 | GI | 61 | Good | — | — | Good | 45 | ND |
| Comparative example 7 | 0.04 | 1,193 | GA | 47 | Good | 4 | Good | — | 41 | 769 |
| Comparative example 8 | 0.04 | 771 | GA | 46 | Good | 8 | Good | — | 15 | 769 |
| Invention example 7 | 0.29 | 1,192 | GA | 44 | Good | 1 | Good | — | 0 | ND |
| Invention example 8 | 0.14 | 1,195 | GA | 45 | Good | 4 | Good | — | 84 | ND |
| Comparative example 9 | 0.21 | 765 | GA | 45 | Poor | 6 | Good | — | 24 | ND |
| Invention example 9 | 0.18 | 1,189 | GI | 59 | Good | — | — | Good | 17 | ND |
| Comparative example 10 | 0.06 | 768 | GA | 45 | Good | 6 | Good | — | 24 | 43 |
| Invention example 10 | 0.21 | 1,021 | GA | 46 | Good | 3 | Good | — | 24 | ND |
| Comparative example 11 | 0.18 | 1,014 | GA | 47 | Good | 7 | Separated | — | 17 | ND |

In Table 3, 1) is the difference (percent by weight) between the local maximum value and the local minimum value of the oxygen profile, 2) is a powdering length (mm), 3) is the length (μm) of B-type LME cracks generated in electrical resistance spot welding, and 4) is the length (μm) of C-type LME cracks generated in electrical resistance spot welding. In the table, ND is 'not-detected'.

In the invention examples 1, 2, 3, 4, 5, 6, 7, 8, 9, and 10, the steel compositions satisfied the range proposed in the present disclosure and the manufacturing method also satisfied the range of the present disclosure, so the tensile strength, the plating quality, the plating adhesion amount, and the spot welding LME crack lengths were also good.

In the comparative examples 5 and 9, the winding temperature during hot roll did not satisfy the range proposed in the present disclosure. The hot-rolling winding temperature was lower than the range proposed in the present disclosure in the comparative example 5, so the oxidation behavior generated in hot rolling was not appropriate. Accordingly, the difference between the local maximum value and the local minimum value of the oxygen profile was less than 0.1 percent by weight, and as a result, the LME cracks did not satisfy a reference. The comparative example 11 was manufactured a over the hot-rolling winding temperature proposed in the present disclosure, so the LME characteristic generated during hot roll was good, but the hot-rolling scale was excessively generated. Accordingly, the scale was not completely removed in acid picking, so non-plating was generated and the surface quality was poor. Further, since the hot-rolling winding temperature was excessively high, the hot-rolled material was softened and was not recovered even after annealing, so the material was inferior.

The comparative example 3 is the case in which the dew point in a furnace during annealing was controlled to be lower than the range proposed in the present disclosure. Since the dew point was sufficiently high during annealing after cold rolling, the oxidation pattern was not appropriate, so the difference of the local maximum value and the local minimum value was less than 0.1%. Further, a soft layer was not appropriately formed, the LME crack lengths were excessively large in spot welding. Since the dew point during annealing was low, it was not controlled into appropriate oxidation behavior, so surface oxides were excessively produced and the surface quality was poor.

In the comparative example 1, the range of the dew point in a furnace exceeded the range proposed in the present disclosure. As the dew point excessively increased, the oxidation pattern was not appropriately controlled, so LME was satisfied, but the material was deteriorated due to excessive internal oxidation. Accordingly, the reference was not satisfied.

In the comparative example 2, the mill speed of the steel sheet in an annealing furnace was higher than the range proposed in the present disclosure. A sufficient time was not given for a decarburization reaction between vapor and the steel sheet in an annealing furnace, so internal oxidation of the surface layer of the steel sheet after annealing was not sufficiently generated. Accordingly, the difference between the local maximum point and the local minimum point was less than 0.1% and exceeded a reference in a spot welding LME crack test, so it was poor.

In the comparative example 10, the soaking zone temperature in an annealing furnace exceeded the range proposed in the present disclosure. As the annealing temperature became excessive, the external oxidation amount increased and an oxidation profile was not formed. Accordingly, the difference between the local maximum value and the local minimum value was less than 0.1%, and as a result, the LME cracks did not satisfy a reference. Further, since austenite was excessively produced and grown in the soaking zone, the material did not satisfy a reference, so it was poor.

The comparative example 8 is the case in which the soaking zone temperature in an annealing furnace was controlled to be lower than the range proposed in the present disclosure. Since the annealing temperature was low, an oxidation reaction was insufficient between vapor and the steel sheet, so an oxidation profile was not appropriately formed. As a result, the difference between the local maximum value and the local minimum value was less than 0.1% and the LME cracks did not satisfy a reference, so spot weldability was poor. Further, recrystallization during annealing was not sufficiently made, so microstructures were not formed, and accordingly, the material did not satisfy a reference and was poor.

The comparative example 4 is a case in which the mill speed of the steel sheet in an annealing furnace was lower than the range proposed in the present disclosure. Accordingly, the material did not satisfy a reference due to excessive growth of grains.

The comparative example 7 is a case in which the cold-rolling reduction ratio exceeds the reference proposed in the present disclosure. The internal oxidation layer formed during hot rolling was thinned due to excessive cold rolling, so the difference between the local maximum value and the local minimum value was less than 0.1% and the LME cracks did not satisfy a reference, so the steel sheet was poor.

In the comparative example 6, the alloying temperature in GA alloying exceeded the range proposed in the present disclosure. Since the Fe-degree of alloying was high, the color was dark, so the surface quality was poor. Powdering was excessive generated in a GA powdering test.

In the comparative example 11, the alloying temperature in GA alloying was lower than the range proposed in the present disclosure. Since the Fe-degree of alloying was lower than a reference, the surface was excessively bright, so the surface quality was poor and the plating surface quality was inferior.

Accordingly, it was possible to see advantageous effects of the present disclosure.

The invention claimed is:

1. A zinc plated steel sheet comprising:
a base steel sheet; and
a zinc-based plating layer formed on a surface of the base steel sheet,
wherein a GDOES profile of oxygen measured in a depth direction from the surface of the base steel sheet has a form in which a local minimum point and a local maximum point sequentially appear in the depth direction from the surface, and
a difference (a local maximum value–a local minimum value) between an oxygen concentration (a local minimum value) at the local minimum point and an oxygen concentration (a local maximum value) at the local maximum point is 0.1 percent by weight or more.

2. The zinc plated steel sheet of claim 1, wherein the local minimum point appears in the range of 0.5-10 μm in the depth direction of the surface of the base steel sheet.

3. The zinc plated steel sheet of claim 1, wherein the local maximum point appears in the range of 4-15 μm in the depth direction of the surface of the base steel sheet.

4. The zinc plated steel sheet of claim 3, wherein the oxygen concentration at the local maximum point is 0.2 percent by weight or more.

5. The zinc plated steel sheet of claim 1, wherein the difference (a local maximum value–a local minimum value) between an oxygen concentration (a local minimum value) at the local minimum point and an oxygen concentration (a local maximum value) at the local maximum point is 0.1 percent by weight or more 0.39 percent by weight or less.

6. The zinc plated steel sheet of claim 1, wherein a plating adhesion amount of the zinc-based plating layer is 30-70 g/m$^2$.

7. The zinc plated steel sheet of claim 1, wherein the steel sheet has composition of C: 0.05-1.5%, Si: 2.0% or less, Mn: 1.0-30%, S—Al (acid-soluble aluminum): 3% or less, Cr: 2.5% or less, Mo: 1% or less, B: 0.005% or less, Nb: 0.2% or less, Ti: 0.2% or less, V: 0.2% or less, Sb+Sn+Bi: 0.1% or less, and N: 0.01% in percent by weight.

* * * * *